US012780556B2

(12) United States Patent
Dai et al.

(10) Patent No.: US 12,780,556 B2
(45) Date of Patent: Nov. 3, 2026

(54) CONVEYING DEVICE SUITABLE FOR CONVEYING OBJECT

(71) Applicant: KONE CORPORATION, Helsinki (FI)

(72) Inventors: Haifeng Dai, Kunshan (CN); Jiesong Nathan Jiang, Kunshan (CN)

(73) Assignee: KONE CORPORATION, Helsinki (FI)

( * ) Notice: Subject to any disclaimer, the term of this patent is extended or adjusted under 35 U.S.C. 154(b) by 414 days.

(21) Appl. No.: 18/402,157

(22) Filed: Jan. 2, 2024

(65) Prior Publication Data

US 2024/0239612 A1 Jul. 18, 2024

(30) Foreign Application Priority Data

Jan. 12, 2023 (CN) ......................... 202310043126.6

(51) Int. Cl.

*B65G 21/08* (2006.01)
*B65G 19/30* (2006.01)
*B65G 41/00* (2006.01)
*B66B 21/02* (2006.01)
*B66B 23/00* (2006.01)
*B66B 31/00* (2006.01)

(52) U.S. Cl.

CPC .............. *B65G 21/08* (2013.01); *B66B 21/02* (2013.01); *B66B 31/006* (2013.01); *B65G 19/30* (2013.01); *B65G 41/003* (2013.01); *B66B 23/00* (2013.01)

(58) Field of Classification Search

CPC ...... B65G 41/003; B65G 19/30; B65G 21/08; B66B 21/02; B66B 31/006; B66B 23/00
USPC .................................................. 198/321, 326
See application file for complete search history.

(56) References Cited

U.S. PATENT DOCUMENTS 4,260,318 A * 4/1981 Holritz .................... B66B 21/02 254/3 R
7,918,325 B2 * 4/2011 Cozzuto .................. B66B 21/02 198/326
8,011,682 B2 * 9/2011 Klein ...................... B66B 31/00 198/326

(Continued)

FOREIGN PATENT DOCUMENTS

CN 119348684 A * 1/2025 ............... B62B 3/02
KR 102570947 B1 * 8/2023 ............. B66B 21/02

*Primary Examiner* — James R Bidwell
(74) *Attorney, Agent, or Firm* — Birch, Stewart, Kolasch & Birch, LLP

(57) ABSTRACT

A conveying device conveys objects. The conveying device can slide on at least two truss beams of the truss of passenger conveying device; setting objects to be transported on the conveying device; the conveying device can move from a first position to a second position different from the first position along the length of the truss of the passenger conveying device, thereby conveying objects to be transported from the first position to the second position; there is a height difference between the first position and the second position, or there is no height difference between the first position and the second position; wear-resistant components made of wear-resistant material are arranged on the conveying device; the wear-resistant components are frictionally sliding on the truss beam; the object to be transported is an upper module of the passenger conveying device and/or a lower module of the passenger conveying device.

19 Claims, 17 Drawing Sheets

(56) References Cited

U.S. PATENT DOCUMENTS

| | | | | |
|---|---|---|---|---|
| 2016/0376128 | A1 * | 12/2016 | González Pantiga | B66B 23/00 198/321 |
| 2017/0225928 | A1 * | 8/2017 | Schneider | B66B 23/14 |

* cited by examiner

CONVEYING DEVICE SUITABLE FOR CONVEYING OBJECT

TECHNICAL FIELD

The present disclosure relates to a conveying device suitable for conveying object, in particular to a conveying device suitable for conveying object on a truss beam of a passenger conveying device or on an ordinary step.

TECHNICAL BACKGROUND

For the solution of modernization of passenger conveyor, it is necessary to remove all the old passenger conveyor modules, but keep the truss of passenger conveyor. Then, a new passenger conveyor module needs to be installed on site, for example, an upper module of the passenger conveyor and a lower module of the passenger conveyor need to be installed on site.

In many cases, especially indoor passenger transport devices, elevator modules cannot be transported from one floor to another by elevators or hoists because of limited space. Therefore, it is necessary to design a conveying device that can slide on the truss beam of the passenger conveyor or on ordinary steps, which is used to transport heavy or large-volume objects, such as but not limited to the upper module of the passenger conveyor and the lower module of the passenger conveyor.

SUMMARY

In order to solve one or more defects in the prior art, according to one aspect of the present disclosure, a conveying device suitable for conveying objects is proposed, wherein the conveying device can slide on at least two truss beams of a truss of a passenger conveying device.

The object to be transported is arranged on the conveying device.

The conveying device can move from a first position to a second position different from the first position along the length of the truss of the passenger conveying device, thereby conveying the objects to be conveyed from the first position to the second position.

According to the above aspect of the present disclosure, there is a height difference between the first position and the second position, or there is no height difference between the first position and the second position.

According to the above aspects of the present disclosure, the conveying device is provided with a wear-resistant component made of a wear-resistant material. The wear-resistant components are frictionally sliding on the truss beam.

According to the above aspects of the present disclosure, the wear-resistant material is polyamide (nylon).

According to the above aspects of the present disclosure, the conveying device includes a first longitudinal bracket, a second longitudinal bracket and a first transverse bracket.

The first transverse bracket is connected between a first end of the first longitudinal bracket and a first end of the second longitudinal bracket.

The first end of the first longitudinal bracket and the first end of the second longitudinal bracket are respectively provided with first arc-shaped parts.

A second end of the first longitudinal bracket and a second end of the second longitudinal bracket are respectively provided with a second arc-shaped assembly.

According to the above aspects of the present disclosure, both the first end of the first longitudinal bracket and the first end of the second longitudinal bracket have arc-shaped ends.

The first arc-shaped part is fixedly fitted on the arc-shaped end part and the first arc-shaped part is fitted on the bottom surfaces of the first longitudinal bracket and the second longitudinal bracket.

According to the above aspects of the present disclosure, the second arc-shaped assembly includes a first bending part, a second bending part, a third substrate and a fourth arc-shaped part.

A first end of the first bending part is fixedly connected to the second end of the first longitudinal bracket and the second end of the second longitudinal bracket.

A second end of the first bending member is fixedly connected to a first end of the second bending member.

The third substrate is fixedly connected to the first bending part and the second bending part.

A second end of the second bending part is arc-shaped.

The fourth arc-shaped part is fixedly connected to the second end of the second bending part and the arc-shaped edge of the third substrate.

At the second end of the first longitudinal bracket and the second end of the second longitudinal bracket, the fourth arc-shaped part is fixedly connected to the bottom surfaces of the first longitudinal bracket and the second longitudinal bracket.

According to the above aspects of the present disclosure, a third substrate through hole is provided on the third substrate.

According to the above aspects of the present disclosure, the conveying device further comprises a second transverse bracket.

The second transverse bracket is connected between the first ends of the two second bending parts.

According to the above aspects of the present disclosure, the first transverse bracket and the second transverse bracket have telescopic structures, so that the distance between the first longitudinal bracket and the second longitudinal bracket can be adjusted.

According to the above-mentioned aspects of the present disclosure, first transverse bracket through holes in an elongated shape are formed on both ends of the first transverse bracket.

Second transverse bracket through holes in an elongated shape are formed on both ends of the second transverse bracket.

The first transverse bracket can be adjustably connected between the first end of the first longitudinal bracket and the first end of the second longitudinal bracket through a fastener passing through the through hole of the first transverse bracket.

The second transverse bracket can be adjustably connected between the first ends of the two second bending parts by a fastener passing through the through hole of the second transverse bracket.

According to the above aspects of the present disclosure, the wear-resistant components are fixedly installed on the bottom surfaces of the first longitudinal bracket and the second longitudinal bracket.

Two end parts of the wear-resistant components are adjacent to the first arc-shaped part and the fourth arc-shaped part respectively and are arranged to smoothly transition with the first arc-shaped part and the fourth arc-shaped part.

The wear-resistant components can slide on the truss beam in friction, thereby reducing the frictional resistance between the conveying device and the truss beam and reducing the wear of the bottom surfaces of the first longitudinal bracket and the second longitudinal bracket and the truss beam.

According to the above aspects of the present disclosure, a plurality of module supporting parts are provided on the top surfaces of the first longitudinal bracket and the second longitudinal bracket.

The module supporting parts are used for installing the object to be transported and supporting the object to be transported.

According to the above aspects of the present disclosure, the first longitudinal bracket includes at least two first bracket sections, and two first bracket sections adjacent to each other are detachably connected together by fasteners.

The second longitudinal bracket comprises at least two second bracket sections, and two adjacent second bracket sections are detachably connected together through fasteners.

The dismountable first longitudinal bracket and the dismountable second longitudinal bracket are beneficial to dismounting the conveying device into a smaller volume after the conveying work is completed, thereby being beneficial to transportation and storage.

It can also be understood by those skilled in the art that each bracket section of the first longitudinal bracket and the second longitudinal bracket can have a telescopic structure, so that the conveying device can be adapted to truss beams with different distances.

According to the above aspects of the present disclosure, the conveying device further comprises a first longitudinal guardrail assembly and a second longitudinal guardrail assembly.

The first longitudinal guardrail assembly can be adjustably connected to the first longitudinal bracket and located outside the first longitudinal bracket.

The second longitudinal guardrail assembly can be adjustably connected to the second longitudinal bracket and located outside the second longitudinal bracket.

The distance between the first longitudinal guardrail assembly and the second longitudinal guardrail assembly can be adjusted.

According to the above aspects of the present disclosure, the first longitudinal guardrail assembly includes a first longitudinal guardrail body and a plurality of first longitudinal guardrail connectors.

The plurality of first longitudinal guardrail connectors are connected to the first longitudinal guardrail body and are arranged at equal intervals along the length direction of the first longitudinal guardrail body.

The second longitudinal guardrail assembly comprises a second longitudinal guardrail body and a plurality of second longitudinal guardrail connectors.

The plurality of second longitudinal guardrail connectors are connected to the second longitudinal guardrail body and are arranged at equal intervals along the length direction of the second longitudinal guardrail body.

According to the above aspects of the present disclosure, the first longitudinal guardrail connector is provided with an elongated first longitudinal guardrail through hole.

The first longitudinal guardrail connector can be adjustably connected to the first longitudinal bracket through a fastener passing through the first longitudinal guardrail through hole.

The second longitudinal guardrail connector is provided with an elongated second longitudinal guardrail through hole.

The second longitudinal guardrail connector can be adjustably connected to the second longitudinal bracket through a fastener passing through the second longitudinal guardrail through hole.

The first longitudinal guardrail assembly and the second longitudinal guardrail assembly help to prevent the truss side bracket from colliding with the first longitudinal bracket and the second longitudinal bracket.

According to the above aspects of the present disclosure, the object to be transported is an upper module of the passenger conveying device and/or a lower module of the passenger conveying device.

According to the above aspects of the present disclosure, the module supporting part is provided with a plurality of module mounting grooves, module fastener holes, module mounting notches and module spindle through holes.

The plurality of module mounting grooves, module fastener holes, module mounting notches and module spindle through holes are used for mounting the upper module and/or the lower module on the first longitudinal bracket and the second longitudinal bracket.

According to the above aspects of the present disclosure, the truss of the passenger conveying device includes a truss side bracket and a plurality of truss beams.

The plurality of truss beams are connected between truss side brackets and arranged at equal intervals along the length direction of the truss.

The first longitudinal bracket and the second longitudinal bracket of the conveying device can slide on the plurality of truss beams.

The first longitudinal bracket, the second longitudinal bracket, the first transverse bracket, the second transverse bracket, the first longitudinal guardrail component and the second longitudinal guardrail component of the conveying device are all located between the truss side brackets and within the height range of the truss side brackets.

The conveying device for conveying heavy objects according to the present disclosure can be used for the modernization of passenger conveying devices.

The conveying device according to the present disclosure can slide on the truss beams of the truss or on ordinary steps, and can safely transport heavy objects from a first position with height difference to a second position, and vice versa. It solves the problem that the limited space cannot transport large-volume objects.

The conveying device according to the present disclosure has a longitudinal bracket that can slide on the truss beam or the normal steps on site and has a first longitudinal guardrail assembly and a second longitudinal guardrail assembly to ensure the correct sliding of the conveying device. In addition, a winch or other towing machine can be installed at the top of the truss to tow the conveying device.

The prior art solution is to disassemble the module into small parts, put these small parts on the upper or lower floor of the elevator, and then install them on site. Compared with the prior art solution that modules need to be assembled on site and good accuracy cannot be maintained for assembly, the conveying device according to the present disclosure (pre-assembled elevator modules will be installed on the conveying device in advance) can save installation time, ensure good installation accuracy, and further save installation cost.

So far, in order that the detailed description of the disclosure herein can be better understood and the contribution of the disclosure to the prior art can be better realized, the disclosure has outlined the contents of the disclosure quite broadly. Of course, embodiments of the present disclosure will be described below and will form the subject of the appended claims.

Likewise, those skilled in the art will recognize that the concept on which this disclosure is based can be easily used as a basis for designing other structures, methods and systems for carrying out the several purposes of this disclosure. Therefore, it is important that the appended claims should be regarded as including such equivalent structures as long as they do not exceed the spirit and scope of this disclosure.

BRIEF DESCRIPTION OF DRAWINGS

Those skilled in the art will have a better understanding of this disclosure through the following drawings, and the advantages of this disclosure can be more clearly reflected. The drawings described here are only for illustrative purposes of selected embodiments, not all possible implementations, and are not intended to limit the scope of the present disclosure.

DETAILED DESCRIPTION

Hereinafter, a specific embodiment according to the present disclosure will be described in detail with reference to each of FIGS. 1 to 17.

Figure 1:
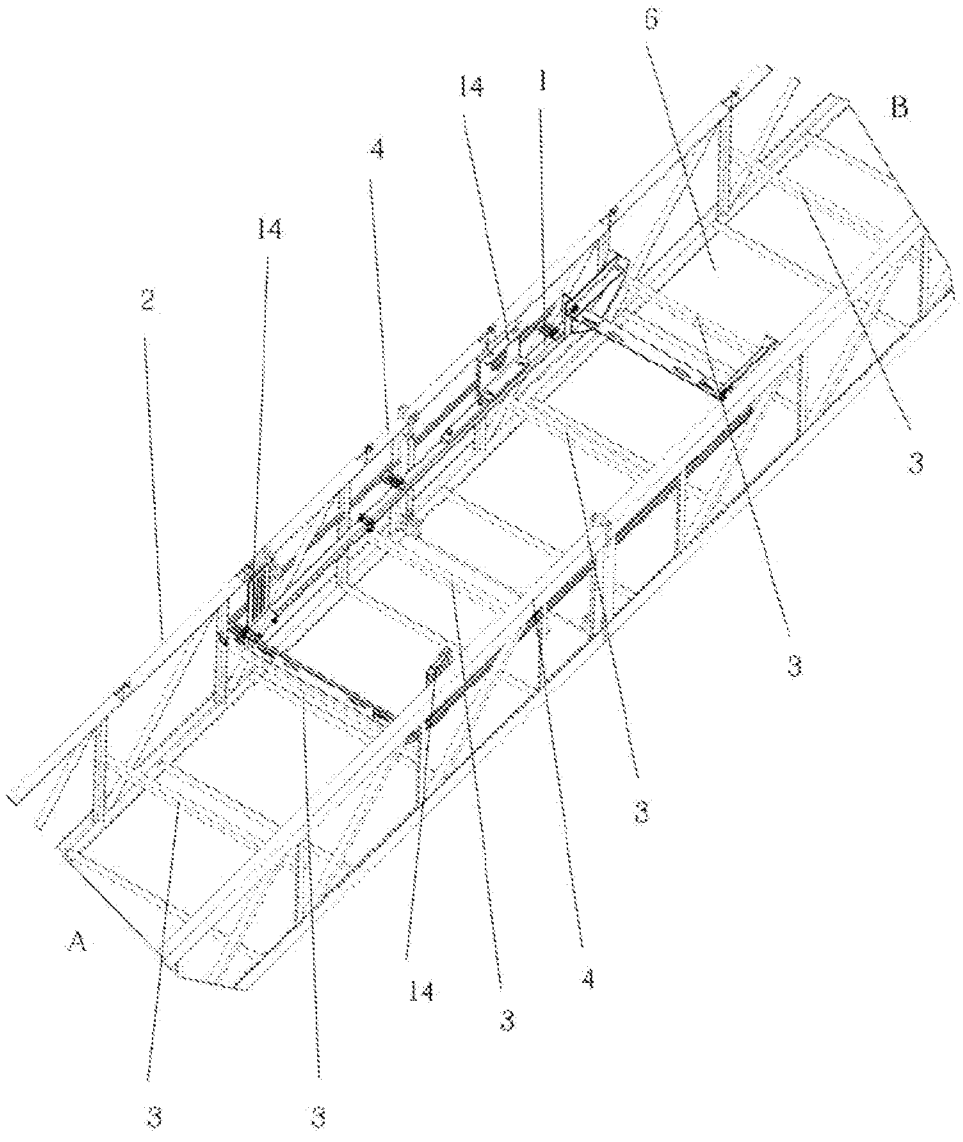
FIG. 1 shows a conveying device suitable for conveying objects according to the present disclosure, which can slide on a truss beam of a truss of a passenger conveying device.

FIG. 1 shows a conveying device 1 suitable for conveying object 5 (see FIG. 2) according to an embodiment of the present disclosure, which can slide on at least two truss beams 3 of a truss 2 of a passenger conveying device.

Figure 2:
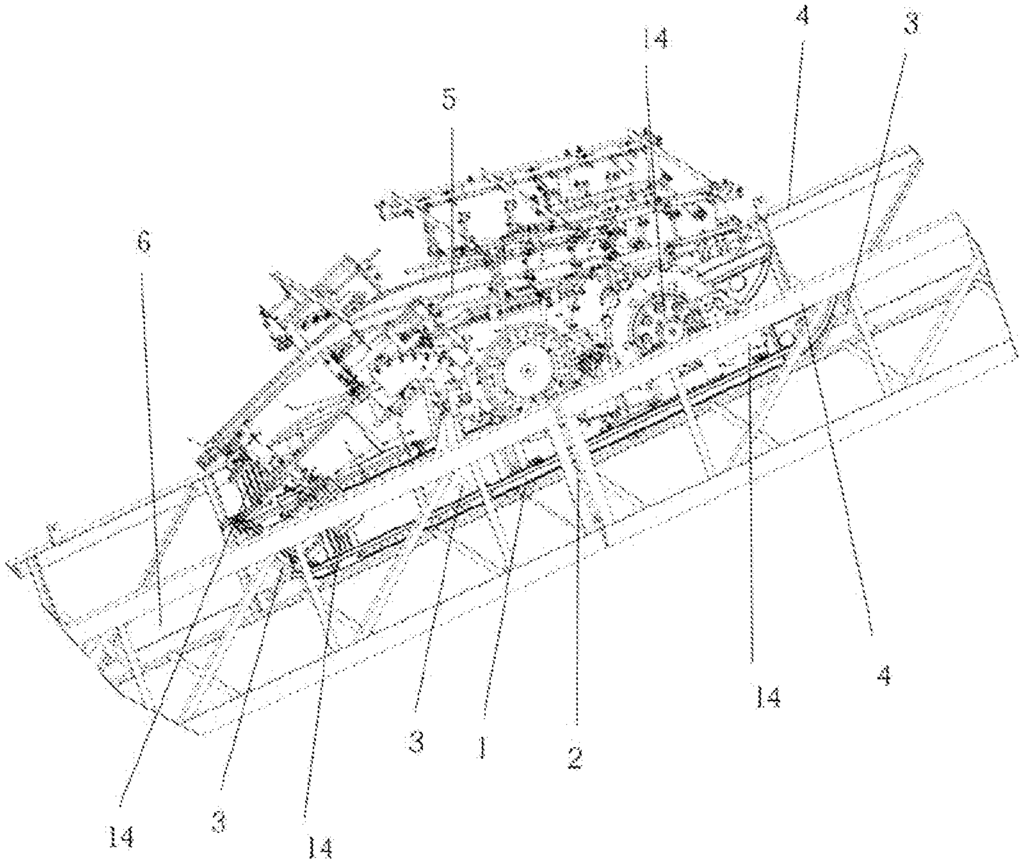
FIG. 2 shows an upper module of a passenger conveyor and/or a lower module of a passenger conveyor installed on a conveying device according to the present disclosure.

FIG. 2 shows an upper module of a passenger conveying device and/or a lower module of a passenger conveying device installed on a conveying device 1 according to the present disclosure.

The object 5 to be transported is arranged on the conveying device 1 (see FIG. 2). In FIG. 1, the truss 2 is arranged obliquely, and the conveying device 1 can move from a first position A to a second position B different from the first position A along the length of the truss 2 of the passenger conveyor, so as to transport the object to be transported from the first position A to the second position B, and vice versa. For example, the passenger conveying device is an escalator.

There is a height difference between the first position A and the second position B.

It can also be understood by those skilled in the art that there may be no height difference between the first position A and the second position B, for example, at the entrance and exit of a pedestrian escalator as a passenger conveying device.

The truss 2 of the passenger conveying device comprises a truss side bracket 4 and a plurality of truss beams 3.

The plurality of truss beams 3 are connected between truss side brackets 4 and arranged at equal intervals along the length direction of the truss 2.

In the configuration shown in FIGS. 1 and 2, the conveying device 1 is basically located in a frame recess 6 formed by the truss side brackets 4 and the plurality of truss beams 3, wherein the plurality of truss beams 3 support the conveying device 1 in the frame recess 6, and the truss side brackets 4 restrict the movement of the conveying device 1 in the frame recess 6 from both sides of the conveying device 1.

The object 5 to be transported is an upper module of the passenger conveying device and/or a lower module of the passenger conveying device.

Figure 3:
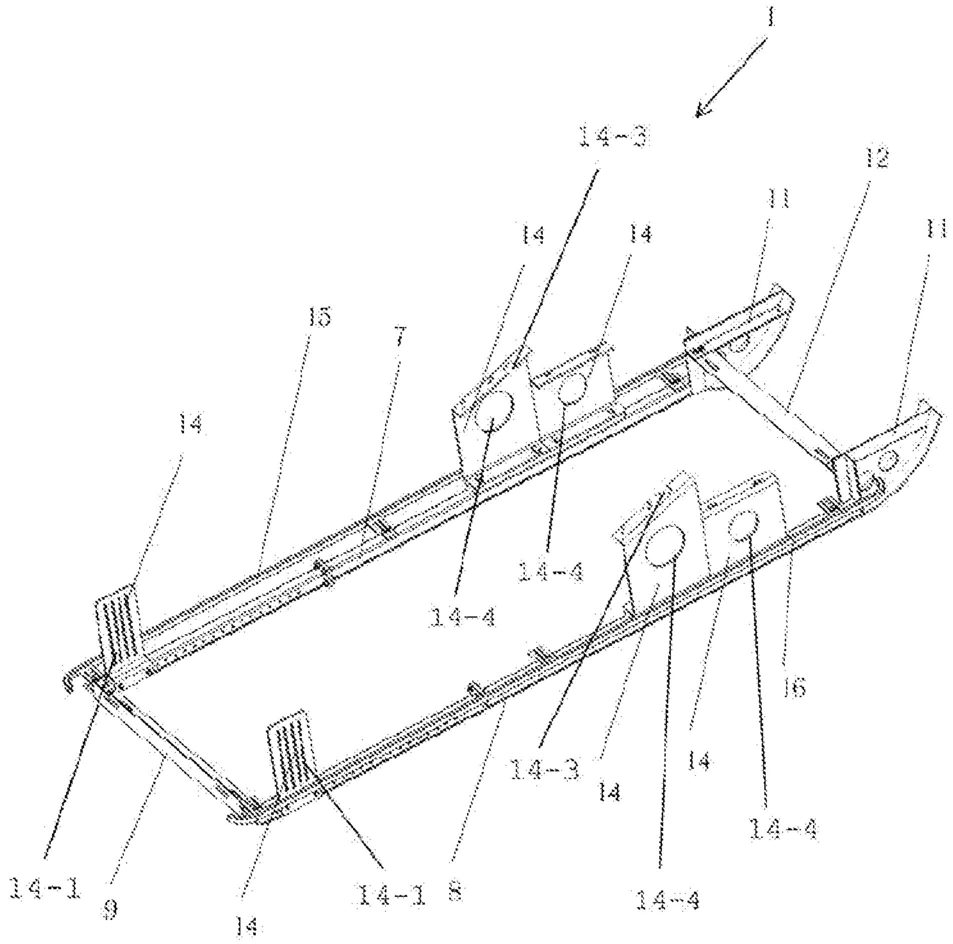
FIG. 3 shows a schematic perspective view of a conveying device according to the present disclosure.

FIG. 3 shows a schematic perspective view of a conveying device 1 according to an embodiment of the present disclosure, which includes a first longitudinal bracket 7, a second longitudinal bracket 8 and a first transverse bracket 9.

The first transverse bracket 9 is connected between a first end of the first longitudinal bracket 7 and a first end of the second longitudinal bracket 8.

Figure 4:
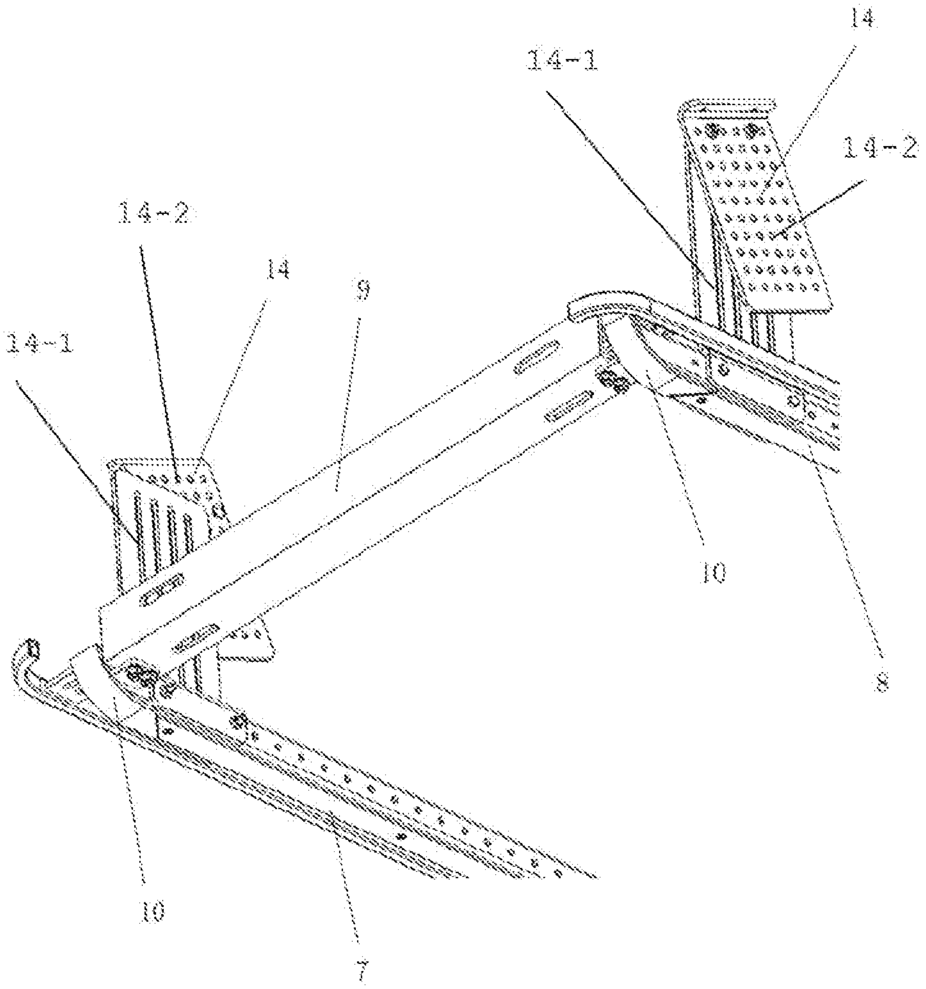
FIG. 4 shows a schematic perspective view of a first end of a conveying device according to the present disclosure, which shows the bottom of the conveying device.
Figure 6:
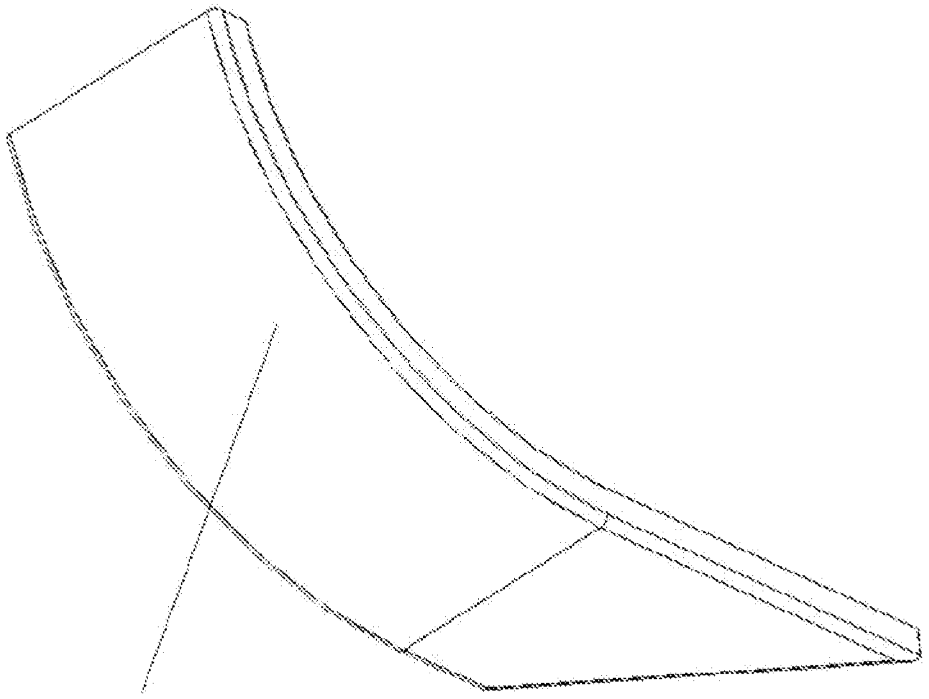
FIG. 6 shows a schematic perspective view of a first arc-shaped part according to the present disclosure.
Figure 7:
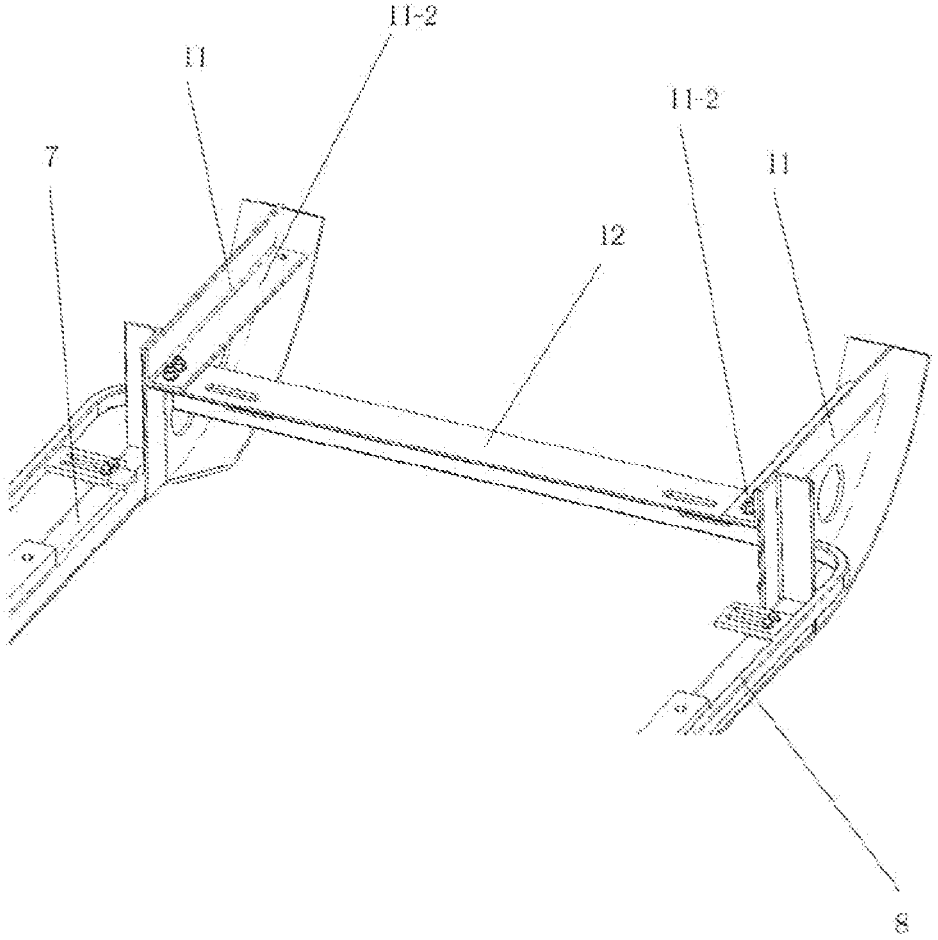
FIGS. 7 and 8 are perspective schematic views showing the second end of the conveying device according to the present disclosure from different perspectives, respectively.
Figure 8:
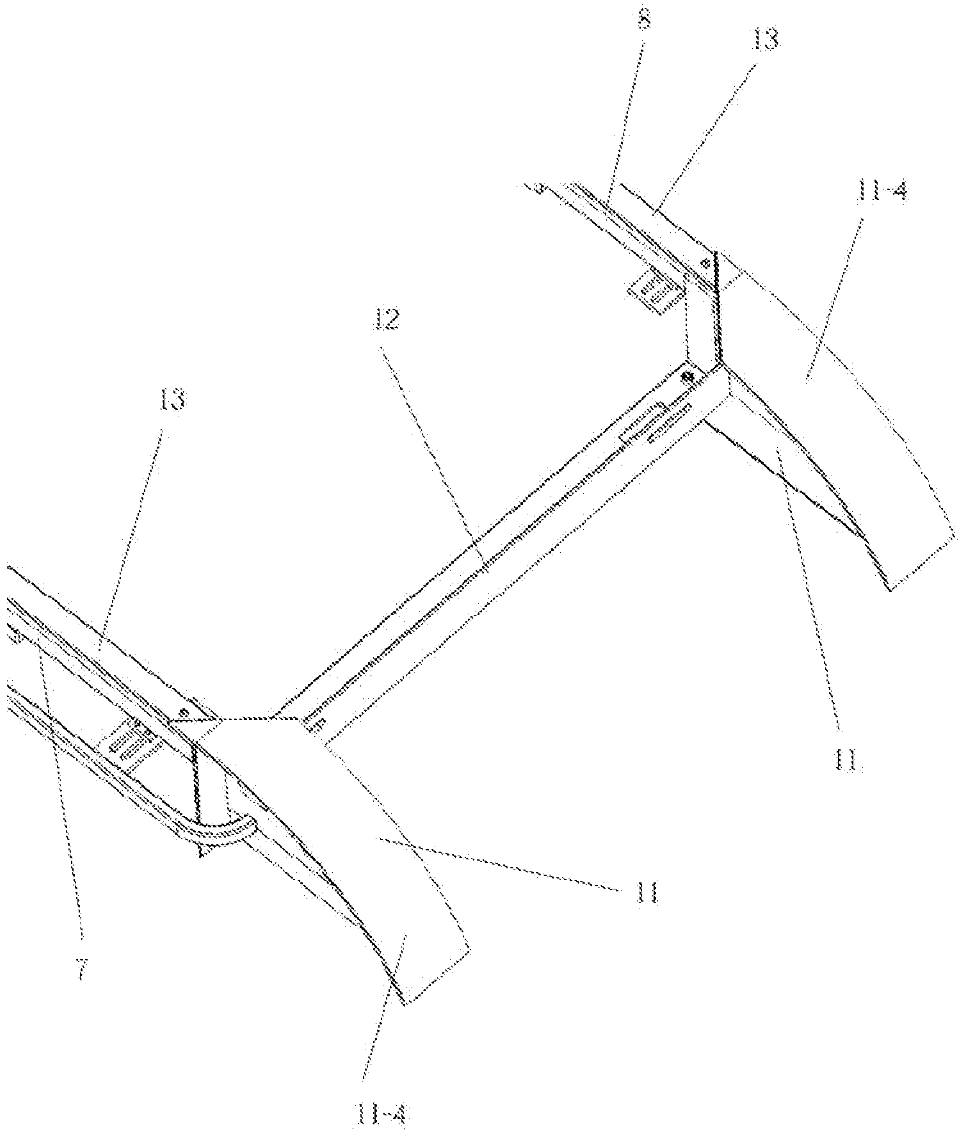
Figure 9:
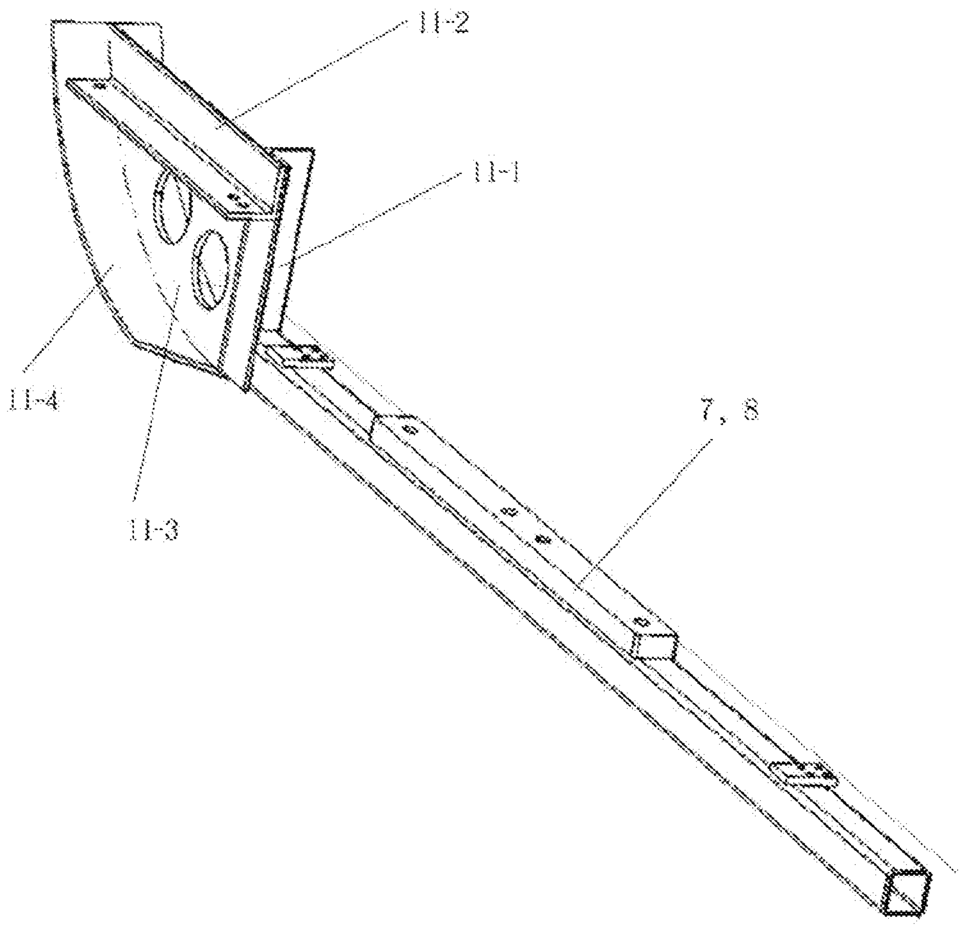
FIG. 9 shows a perspective schematic view of the first and second longitudinal brackets and a second arc-shaped assembly installed on the first and second longitudinal brackets according to the present disclosure.
Figure 10:
FIG. 10 shows a schematic perspective view of a first bending part according to the present disclosure.
Figure 11:
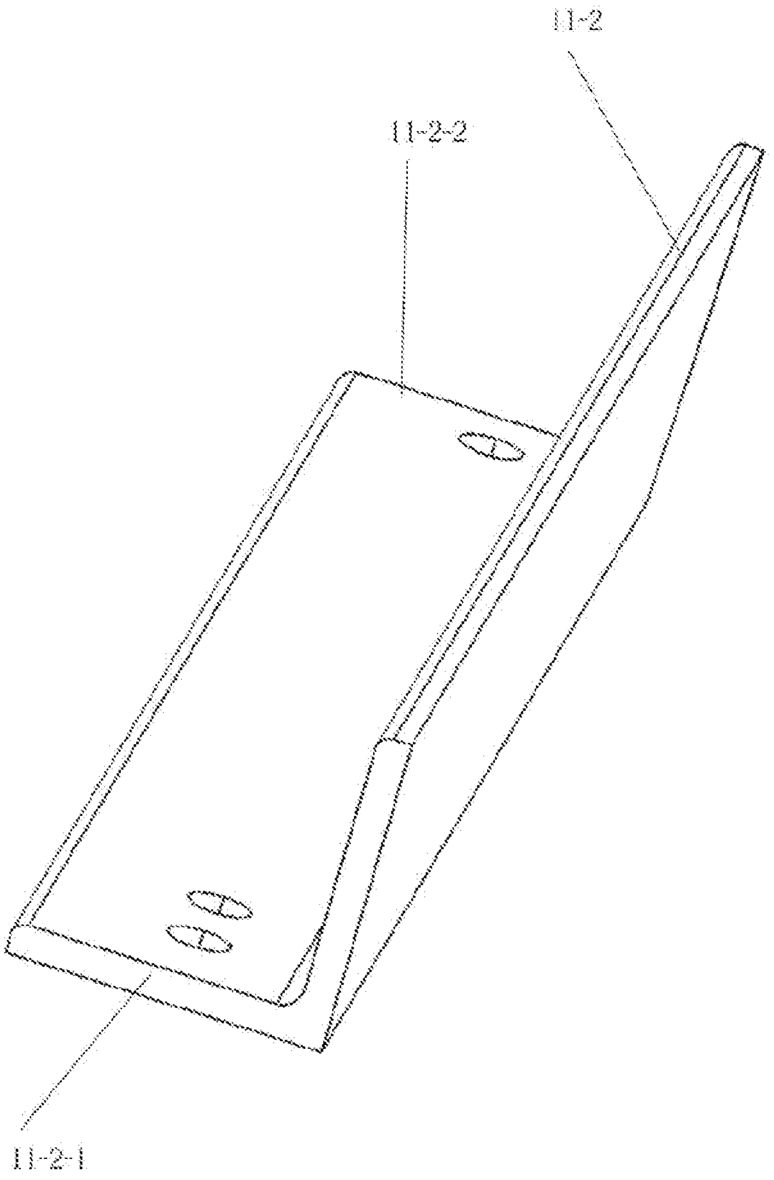
FIG. 11 shows a perspective schematic view of a second bending part according to the present disclosure.
Figure 12:
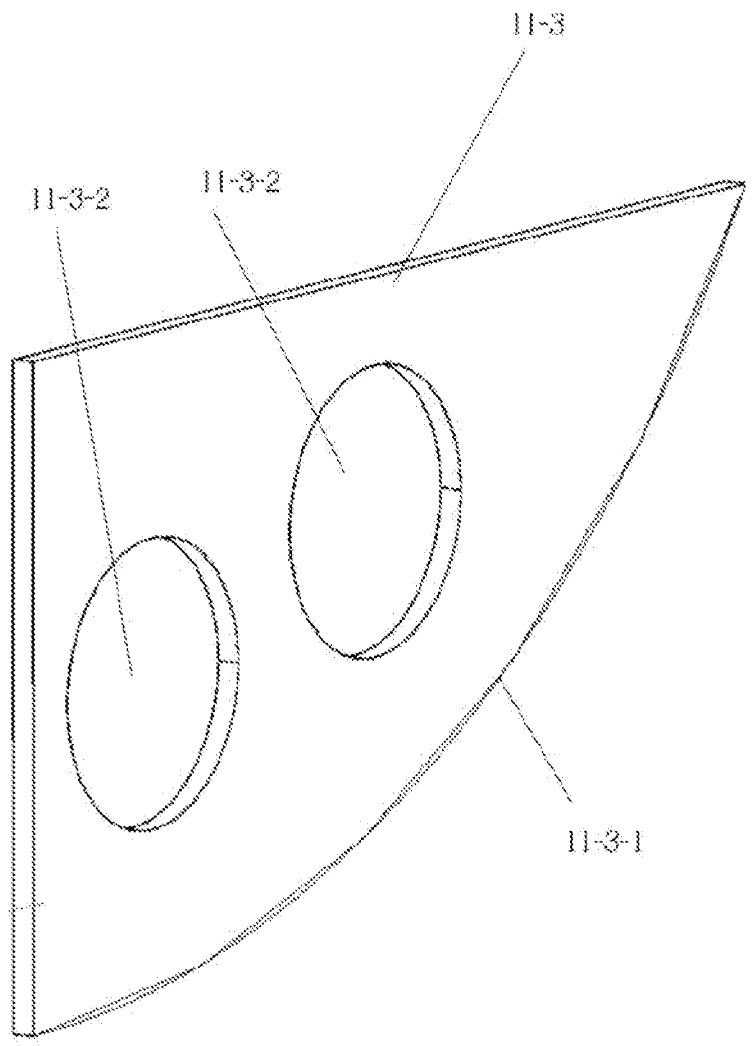
FIG. 12 shows a schematic perspective view of a third substrate according to the present disclosure.
Figure 13:
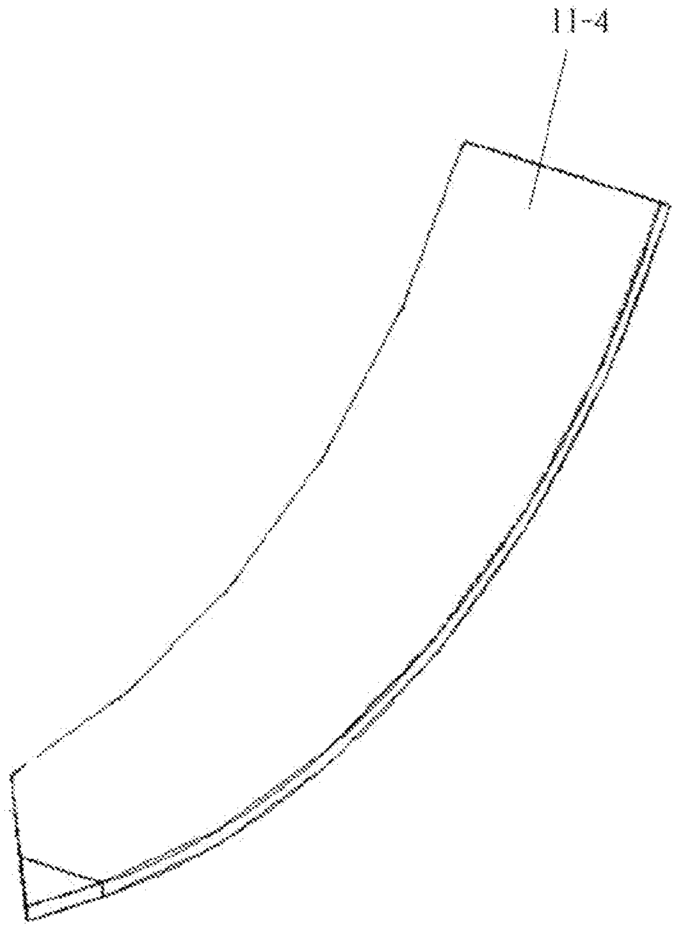
FIG. 13 shows a perspective schematic view of a fourth arc-shaped part in an arc shape according to the present disclosure.

As shown in FIG. 4, the first end of the first longitudinal bracket 7 and the first end of the second longitudinal bracket 8 are respectively provided with first arc-shaped parts 10 (see FIG. 6).

A second end of the first longitudinal bracket 7 and a second end of the second longitudinal bracket 8 are respectively provided with a second arc assembly 11.

Figure 5:
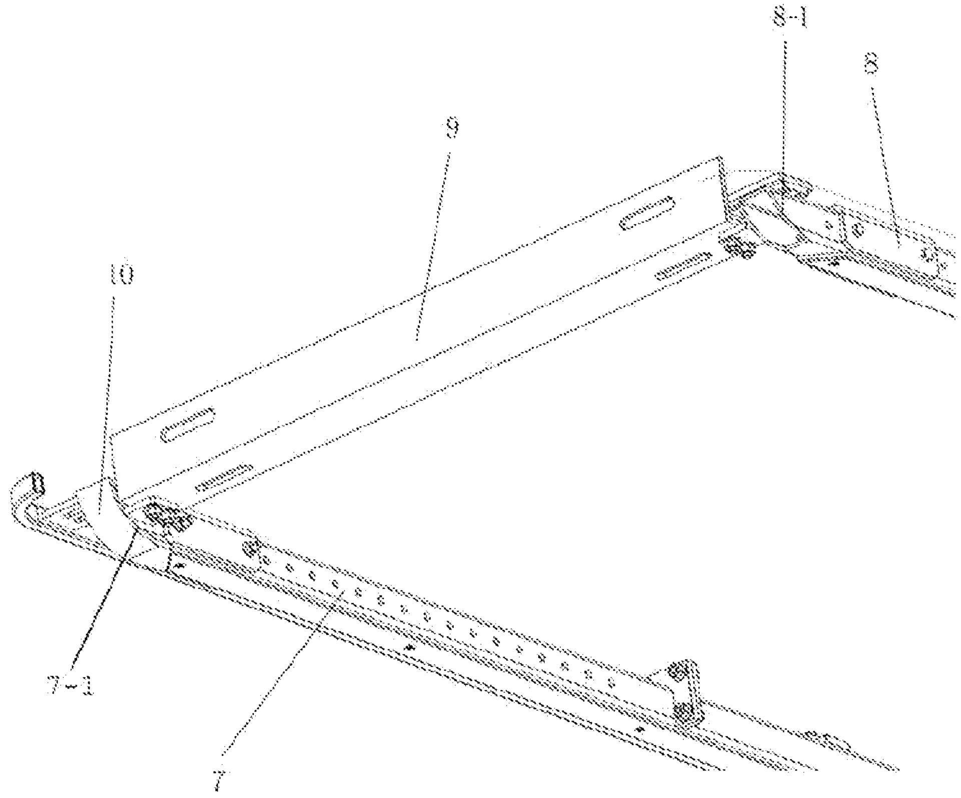
FIG. 5 is a partially simplified view of FIG. 4.

As shown in FIG. 5, both the first end of the first longitudinal bracket 7 and the first end of the second longitudinal bracket 8 have arc-shaped ends 7-1 and 8-1.

The first arc-shaped part 10 is fixedly fitted on the arc-shaped end 8-1 and is fitted on the bottom surfaces of the first longitudinal bracket 7 and the second longitudinal bracket 8.

As shown in FIGS. 7 to 13, the second arc-shaped assembly 11 includes a first bending part 11-1, a second bending part 11-2, a third substrate 11-3 and a fourth arc-shaped part 11-4.

A first end 11-1-1 of the first bending part 11-1 is fixedly connected to the second end of the first longitudinal bracket 7 and the second end of the second longitudinal bracket 8.

A second end 11-1-2 of the first bending part 11-1 is fixedly connected to a first end 11-2-1 of the second bending part 11-2.

The third substrate 11-3 is fixedly connected to the first bending part 11-1 and the second bending part 11-2.

A second end 11-2-2 of the second bending part 11-2 is in an arc shape.

The fourth arc-shaped part 11-4 is fixedly connected to the second end 11-2-2 of the second bending part 11-2 and an arc-shaped edge 11-3-1 of the third substrate 11-3.

At the second end of the first longitudinal bracket 7 and the second end of the second longitudinal bracket 8, the fourth arc-shaped part 11-4 is fixedly connected to the bottom surfaces of the first longitudinal bracket 7 and the second longitudinal bracket 8.

The third substrate 11-3 is provided with a third substrate through hole 11-3-2.

The conveying device 1 further comprises a second transverse bracket 12.

The second transverse bracket 12 is connected between the first ends 11-2-1 of the two second bending members 11-2.

The first transverse bracket 9 and the second transverse bracket 12 have telescopic structures, so that the distance between the first longitudinal bracket 7 and the second longitudinal bracket 8 can be adjusted, thus being suitable for trusses of different types of passenger conveying devices. For example, the distance between the first longitudinal bracket 7 and the second longitudinal bracket 8 is, for example, but not limited to, 600 mm, 800 mm or 1000 mm.

In addition to the telescopic structure of the first transverse bracket 9 and the second transverse bracket 12, the elongated first transverse bracket through holes may be formed at both ends of the first transverse bracket 9.

The elongated second transverse bracket through holes are formed at both ends of the second transverse bracket 12.

The first transverse bracket 9 is adjustably connected between the first end of the first longitudinal bracket 7 and the first end of the second longitudinal bracket 8 by fasteners passing through the first transverse bracket through holes.

The second transverse bracket 12 can be adjustably connected between the first ends of the two second bending members 11-2 by fasteners passing through the second transverse bracket through holes.

Figure 14:
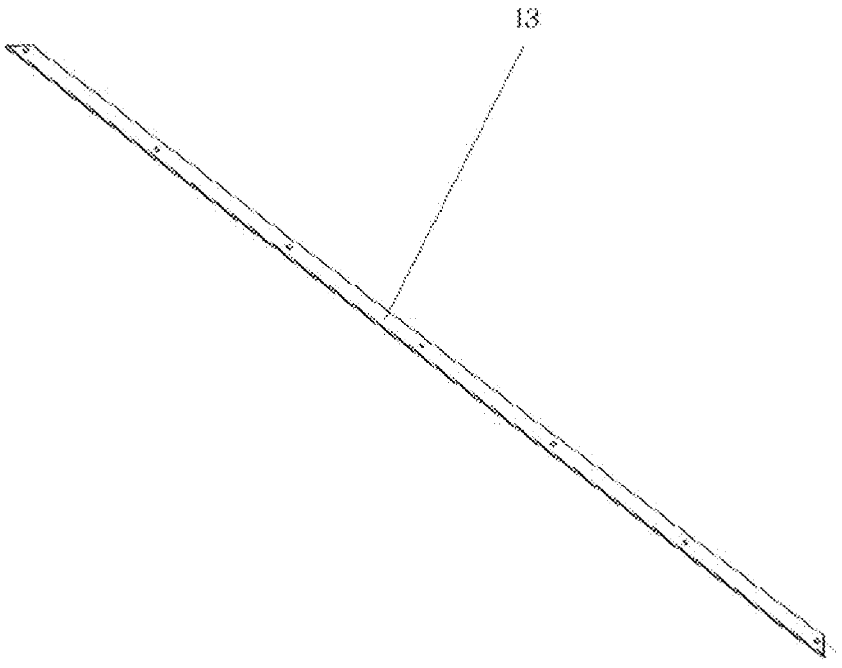
FIG. 14 shows a wear-resistant component according to the present disclosure.
Figure 15:
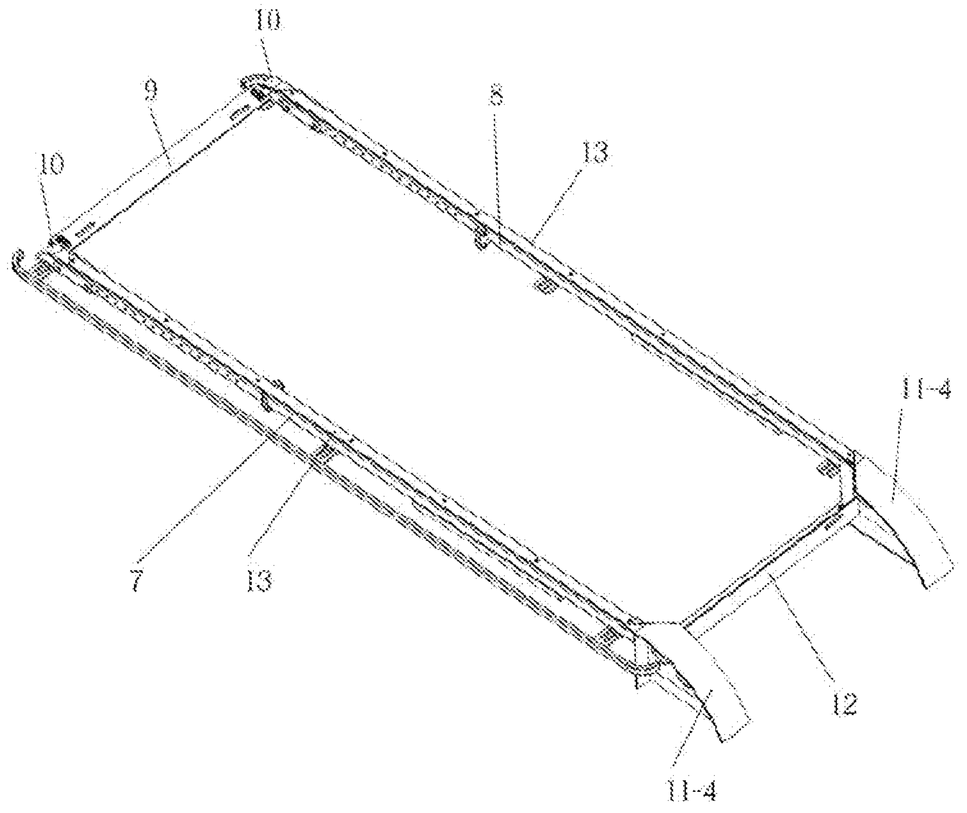
FIG. 15 shows a bottom view of the conveying device according to the present disclosure, in which wear-resistant components are installed on the bottom surfaces of the first longitudinal bracket and the second longitudinal bracket, respectively.

As shown in FIG. 14, the conveying device 1 is provided with a wear-resistant components 13 made of a wear-resistant material, such as but not limited to polyamide (nylon).

The wear-resistant components 13 can slide on the truss beam 3 in a frictional manner, thereby reducing the frictional resistance between the conveying device 1 and the truss beam 3 and reducing the wear of the bottom surfaces of the first longitudinal bracket 7 and the second longitudinal bracket 8 and the truss beam 3.

The wear-resistant components 13 are fixedly installed on the bottom surfaces of the first longitudinal bracket 7 and the second longitudinal bracket 8.

The conveying device 1 can slide not only on at least two truss beams 3 of a truss 2 of an escalator or a pedestrian escalator, but also on a flat or inclined ground.

Two end portions of the wear-resistant components 13 are adjacent to the first arc-shaped part 10 and the fourth arc-shaped part 11-4 respectively and are arranged to smoothly transition with the first arc-shaped part 10 and the fourth arc-shaped part 11-4.

The wear-resistant components 13 may also be formed on the arc surfaces of the first arc-shaped part 10 and the fourth arc-shaped part 11-4. The first arc-shaped part 10 and the fourth arc-shaped part 11-4 facilitate the conveying device to cross the bent corner portion (not shown) of the truss, such as the joint between the inclined part of the truss and an upper platform part and a lower platform part of the elevator.

As shown in FIGS. 3 and 4, a plurality of module support parts 14 are provided on the top surfaces of the first longitudinal bracket 7 and the second longitudinal bracket 8.

The module supporting part 14 is used for installing the object 5 to be transported and supporting the object 5 to be transported.

Figure 16:
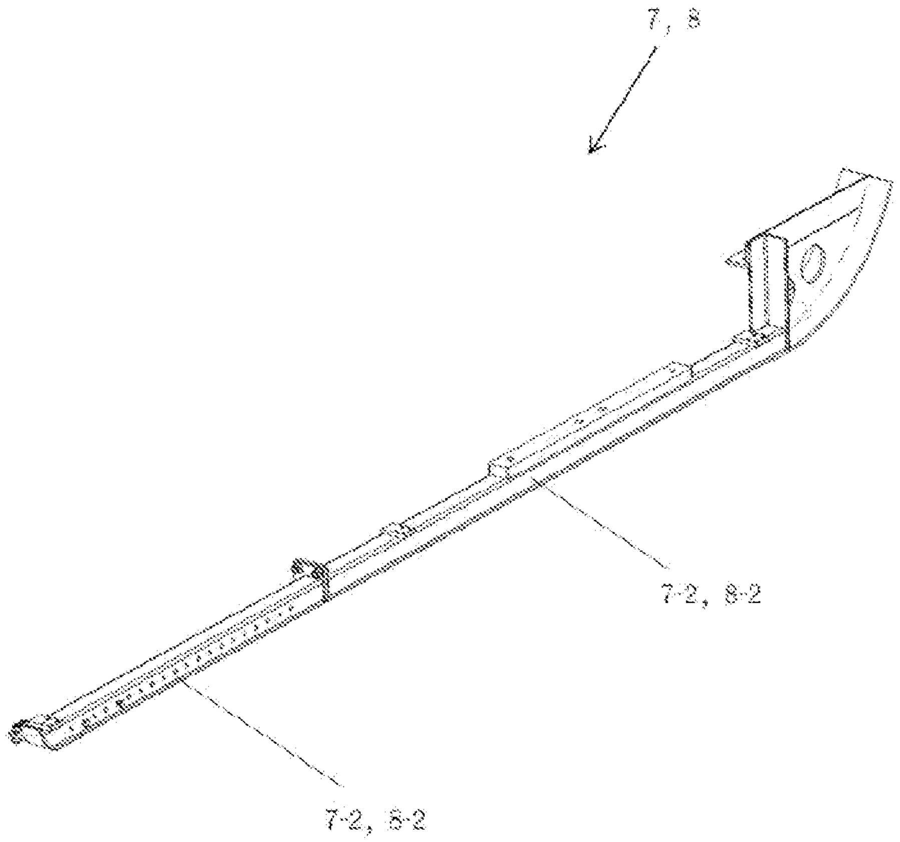
FIG. 16 shows a schematic view of a first longitudinal bracket and a second longitudinal bracket respectively having two bracket sections according to the present disclosure.

FIG. 16 shows a schematic diagram in which the first longitudinal bracket 7 and the second longitudinal bracket 8 have two bracket sections, respectively, according to an embodiment of the present disclosure. As shown in FIG. 16, the first longitudinal bracket 7 includes at least two first bracket sections 7-2, and two adjacent first bracket sections 7-2 are detachably connected together by fasteners.

The second longitudinal bracket 8 includes at least two second bracket sections 8-2, and two adjacent second bracket sections 8-2 are detachably connected together by fasteners.

The detachable first longitudinal bracket 7 and the detachable second longitudinal bracket 8 are beneficial to disassembling the conveying device 1 into a smaller volume after the conveying work is completed, and are further beneficial to transportation and storage.

It can also be understood by those skilled in the art that each bracket section of the first longitudinal bracket 7 and the second longitudinal bracket 8 can have a telescopic structure, so that the conveying device can be adapted to truss beams with different distances.

Figure 17:
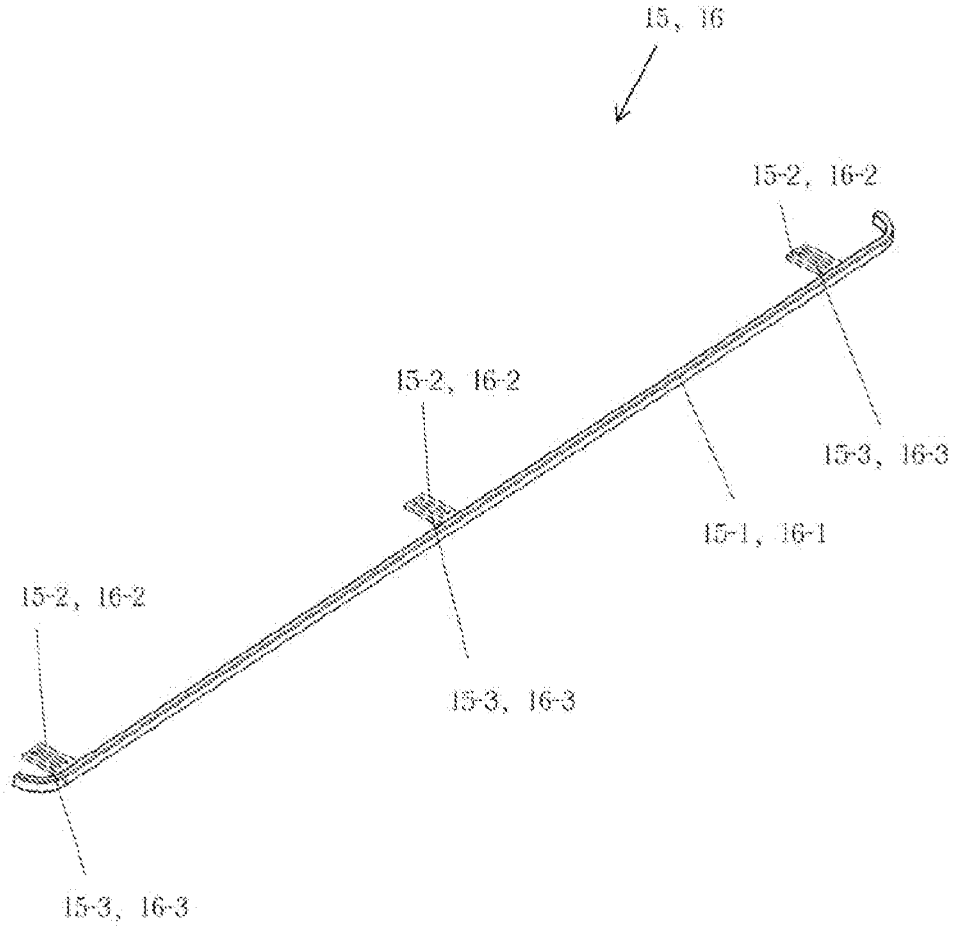
FIG. 17 shows a schematic perspective view of a first longitudinal guardrail assembly and a second longitudinal guardrail assembly according to the present disclosure.

FIG. 17 shows a schematic perspective view of a first longitudinal guardrail assembly 15 and a second longitudinal guardrail assembly 16 according to an embodiment of the present disclosure. As shown in FIG. 17, the conveying device 1 further includes the first longitudinal guardrail assembly 15 and the second longitudinal guardrail assembly 16.

The first longitudinal guardrail assembly 15 is adjustably connected to the first longitudinal bracket 7 and located outside the first longitudinal bracket 7.

The second longitudinal guardrail assembly 16 is adjustably connected to the second longitudinal bracket 8 and located outside the second longitudinal bracket 8.

The distance between the first longitudinal guardrail assembly 15 and the second longitudinal guardrail assembly 16 can be adjusted.

The first longitudinal guardrail assembly 15 and the second longitudinal guardrail assembly 16 help to prevent the truss side bracket 4 from colliding with the first longitudinal bracket 7 and the second longitudinal bracket 8.

The lengths of the first longitudinal guardrail assembly 15 and the second longitudinal guardrail assembly 16 are longer than those of the first longitudinal bracket 7 and the second longitudinal bracket 8, and two end portions of the first longitudinal guardrail assembly 15 and the second longitudinal guardrail assembly 16 respectively exceed the first transverse bracket 9 and the second transverse bracket 12.

The first longitudinal guardrail assembly 15 includes a first longitudinal guardrail body 15-1 and a plurality of first longitudinal guardrail connectors 15-2.

The two ends of the first longitudinal guardrail body 15-1 are curved bends.

The plurality of first longitudinal guardrail connectors 15-2 are connected to the first longitudinal guardrail body 15-1 and arranged at equal intervals along the length direction of the first longitudinal guardrail body 15-1.

The second longitudinal guardrail assembly 16 includes a second longitudinal guardrail body 16-1 and a plurality of second longitudinal guardrail connectors 16-2.

The two end portions of the second longitudinal guardrail body 16-1 are curved bends.

The plurality of second longitudinal guardrail connectors 16-2 are connected to the second longitudinal guardrail body 16-1 and arranged at equal intervals along the length direction of the second longitudinal guardrail body 16-1.

The first longitudinal guardrail connector 15-2 is provided with an elongated first longitudinal guardrail through hole 15-3.

The first longitudinal guardrail connector 15-2 can be adjustably connected to the first longitudinal bracket 7 by a fastener passing through the first longitudinal guardrail through hole 15-3.

The second longitudinal guardrail connector 16-2 is provided with an elongated second longitudinal guardrail through hole 16-3.

The second longitudinal guardrail connector 16-2 can be adjustably connected to the second longitudinal bracket 8 by a fastener passing through the second longitudinal guardrail through hole 16-3.

The module supporting member 14 is provided with a plurality of module mounting grooves 14-1, module fastener holes 14-2, module mounting notches 14-3 and module spindle through holes 14-4.

The plurality of module mounting grooves 14-1, module fastener holes 14-2, module mounting notches 14-3 and module spindle through holes 14-4 are configured for mounting the upper module and/or the lower module on the first longitudinal bracket 7 and the second longitudinal bracket 8.

The first longitudinal bracket 7 and the second longitudinal bracket 8 of the conveying device can slide on the plurality of truss beams 3.

The first longitudinal bracket 7, the second longitudinal bracket 8, the first transverse bracket 9, the second transverse bracket 12, the first longitudinal guardrail assembly 15 and the second longitudinal guardrail assembly 16 of the conveying device are all located between the truss side brackets 4 and within the height range of the truss side brackets 4.

The foregoing disclosure provides illustration and description, but is not intended to be exhaustive or to limit the embodiments to the precise forms disclosed. Modifications and variations are possible in light of the above disclosure, or may be acquired from practice of the embodiments.

Even if specific combinations of features are recited in the claims and/or disclosed in the specification, these combinations are not intended to limit the disclosure of various embodiments. In fact, many of these features can be combined in ways not specifically recited in the claims and/or not specifically disclosed in the specification. Although each dependent claim listed below may directly depend on only one claim, the disclosure of various embodiments includes each dependent claim in combination with every other claim in the claim set.

The invention claimed is:

1. A conveying device suitable for conveying an object, wherein the conveying device is slidable on at least two truss beams of a truss of a passenger conveying device, wherein said object to be transported can be set on the conveying device, wherein the conveying device is movable from a first position to a second position different from the first position along a length of the truss of the passenger conveying device, thereby conveying said object to be transported from the first position to the second position, wherein wear-resistant components made of wear-resistant material are arranged on the conveying device, and wherein the wear-resistant components are frictionally slidable on the truss beam.

2. The conveying device according to claim 1, wherein there is a height difference between the first position and the second position, or wherein there is no height difference between the first position and the second position.

3. The conveying device according to claim 1, wherein the wear-resistant material is polyamide (nylon).

4. The conveying device according to claim 3, wherein the conveying device comprises a first longitudinal bracket, a second longitudinal bracket and a first transverse bracket, wherein the first transverse bracket is connected between a first end of the first longitudinal bracket and a first end of the second longitudinal bracket, wherein the first end of the first longitudinal bracket and the first end of the second longitudinal bracket are respectively provided with first arc-shaped parts, and wherein a second end of the first longitudinal bracket and a second end of the second longitudinal bracket are respectively provided with a second arc-shaped assembly.

5. The conveying device according to claim 4, wherein the first end of the first longitudinal bracket and the first end of the second longitudinal bracket both have arc-shaped ends, and wherein the first arc-shaped part is fixedly fitted on the arc-shaped end and the first arc-shaped part is fitted on bottom surfaces of the first longitudinal bracket and the second longitudinal bracket.

6. The conveying device according to claim 4, wherein the second arc-shaped assembly comprises first bending parts, second bending parts, a third substrate and a fourth arc-shaped part, wherein a first end of the first bending part is fixedly connected to the second end of the first longitudinal bracket and the second end of the second longitudinal bracket, wherein a second end of the first bending part is fixedly connected to a first end of the second bending part, wherein the third substrate is fixedly connected to the first bending part and the second bending part, wherein the second end of the second bending part is arc-shaped, wherein the fourth arc-shaped part is fixedly connected to a second end of the second bending part and the arc-shaped edge of the third substrate, and wherein at the second end of the first longitudinal bracket and the second end of the second longitudinal bracket, the fourth arc-shaped part is fixedly connected to the bottom surfaces of the first longitudinal bracket and the second longitudinal bracket.

7. The conveying device according to claim 6, wherein a third substrate through hole is arranged on the third substrate.

8. The conveying device according to claim 6,
wherein the carrying device further comprises a second transverse bracket, and
wherein the second transverse bracket is connected between the first ends of the two second bending parts.

9. The conveying device according to claim 8, wherein the first transverse bracket and the second transverse bracket have telescopic structures, so that the distance between the first longitudinal bracket and the second longitudinal bracket can be adjusted.

10. The conveying device according to claim 8,
wherein elongated first transverse bracket through holes are formed on both ends of the first transverse bracket,
wherein elongated second transverse bracket through holes are formed on both ends of the second transverse bracket,
wherein the first transverse bracket can be adjustably connected between the first end of the first longitudinal bracket and the first end of the second longitudinal bracket through a fastener passing through the through hole of the first transverse bracket, and
wherein the second transverse bracket can be adjustably connected between the first ends of the two second bending parts by a fastener passing through the through hole of the second transverse bracket.

11. The conveying device according to claim 8,
wherein the wear-resistant components are fixedly installed on the bottom surfaces of the first longitudinal bracket and the second longitudinal bracket, and
wherein two end parts of the wear-resistant component are adjacent to the first arc-shaped part and the fourth arc-shaped part respectively and are arranged to smoothly transition with the first arc-shaped part and the fourth arc-shaped part.

12. The conveying device according to claim 8,
wherein a plurality of module supporting parts are arranged on top surfaces of the first longitudinal bracket and the second longitudinal bracket, and
wherein the module supporting part is used for installing the object to be transported and supporting the object to be transported.

13. The conveying device according to claim 11,
wherein the first longitudinal bracket comprises at least two first bracket sections, and two adjacent of the first bracket sections are detachably connected together through fasteners, and
wherein the second longitudinal bracket comprises at least two second bracket sections, and two adjacent of the second bracket sections are detachably connected together through fasteners.

14. The conveying device according to claim 11,
wherein the conveying device further comprises a first longitudinal guardrail assembly and a second longitudinal guardrail assembly,
wherein the first longitudinal guardrail assembly can be adjustably connected to the first longitudinal bracket and positioned outside the first longitudinal bracket,
wherein the second longitudinal guardrail assembly can be adjustably connected to the second longitudinal bracket and positioned outside the second longitudinal bracket, and
wherein a distance between the first longitudinal guardrail assembly and the second longitudinal guardrail assembly can be adjusted.

15. The conveying device according to claim 14,
wherein the first longitudinal guardrail assembly comprises a first longitudinal guardrail body and a plurality of first longitudinal guardrail connectors,
wherein the plurality of first longitudinal guardrail connectors are connected to the first longitudinal guardrail body and are arranged at equal intervals along a length direction of the first longitudinal guardrail body,
wherein the second longitudinal guardrail assembly comprises a second longitudinal guardrail body and a plurality of second longitudinal guardrail connectors, and
wherein the plurality of second longitudinal guardrail connectors are connected to the second longitudinal guardrail body and are arranged at equal intervals along a length direction of the second longitudinal guardrail body.

16. The conveying device according to claim 15,
wherein the first longitudinal guardrail connector is provided with an elongated first longitudinal guardrail through hole,
wherein the first longitudinal guardrail connector can be adjustably connected to the first longitudinal bracket through a fastener passing through the first longitudinal guardrail through hole,
wherein the second longitudinal guardrail connector is provided with an elongated second longitudinal guardrail through hole, and
wherein the second longitudinal guardrail connector can be adjustably connected to the second longitudinal bracket through a fastener passing through the second longitudinal guardrail through hole.

17. The conveying device according to claim 16, wherein the object to be transported is an upper module of the passenger conveying device and/or a lower module of the passenger conveying device.

18. The conveying device according to claim 17,
wherein the module supporting part is provided with a plurality of module mounting grooves, module fastener holes, module mounting notches and module spindle through holes, and
wherein the plurality of module mounting grooves, module fastener holes, module mounting notches and module spindle through holes are used for mounting the upper module and/or the lower module on the first longitudinal bracket and the second longitudinal bracket.

19. The conveying device according to claim 8,
wherein the truss of the passenger conveying device comprises a truss side bracket and a plurality of truss beams,
wherein the plurality of truss beams are connected between truss side brackets and arranged at equal intervals along a length direction of the truss,
wherein the first longitudinal bracket and the second longitudinal bracket of the conveying device can slide on the plurality of truss beams, and
wherein the first longitudinal bracket, the second longitudinal bracket, the first transverse bracket, the second transverse bracket, the first longitudinal guardrail assembly and the second longitudinal guardrail assembly of the conveying device are all located between the truss side brackets and within the height range of the truss side brackets.

* * * * *